United States Patent
Ahn et al.

(10) Patent No.: US 8,442,718 B2
(45) Date of Patent: May 14, 2013

(54) BATTERY CHARGING SYSTEM FOR VEHICLE AND CONTROL METHOD OF THE SAME

(75) Inventors: Chikung Ahn, Hwaseong-si (KR); Minyoung Jung, Hwaseong-si (KR); Junyong Lee, Hwaseong-si (KR); Daekwang Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/296,756

(22) Filed: Nov. 15, 2011

(65) Prior Publication Data

US 2013/0024068 A1   Jan. 24, 2013

(30) Foreign Application Priority Data

Jul. 21, 2011   (KR) .................. 10-2011-0072344

(51) Int. Cl.
*G06F 7/00* (2006.01)
(52) U.S. Cl.
USPC ............................................................ 701/36
(58) Field of Classification Search ............... 290/40 C; 303/146; 320/134, 127; 307/9.1, 10.1
See application file for complete search history.

(56) References Cited

U.S. PATENT DOCUMENTS

| | | | | |
|---|---|---|---|---|
| 6,452,286 | B1 * | 9/2002 | Kubo et al. ............... | 290/40 C |
| 7,443,139 | B2 * | 10/2008 | Mitsui et al. ............... | 320/134 |
| 7,479,761 | B2 * | 1/2009 | Okumura ............... | 320/132 |
| 7,906,864 | B2 * | 3/2011 | Ko ............... | 290/40 C |
| 8,138,720 | B2 * | 3/2012 | Snyder et al. ............... | 320/127 |
| 2007/0273204 | A1 * | 11/2007 | Kodama et al. ............... | 303/146 |
| 2009/0206660 | A1 * | 8/2009 | Makita et al. ............... | 307/9.1 |
| 2010/0001523 | A1 | 1/2010 | Sato et al. | |
| 2011/0025127 | A1 * | 2/2011 | Choi et al. ............... | 307/10.1 |
| 2011/0109274 | A1 * | 5/2011 | Minamiura ............... | 320/134 |

FOREIGN PATENT DOCUMENTS

| | | |
|---|---|---|
| JP | 2005-137091 A | 5/2005 |
| JP | 2008-7003 A | 1/2008 |
| JP | 2009-1049 A | 1/2009 |
| JP | 2009-78807 A | 4/2009 |
| KR | 10-0867795 B1 | 11/2008 |
| KR | 10-2009-0060796 A | 6/2009 |
| KR | 10-1010293 B1 | 1/2011 |
| KR | 10-2011-0024307 A | 3/2011 |
| KR | 10-1028020 B1 | 4/2011 |
| KR | 10-1031900 B1 | 5/2011 |

* cited by examiner

*Primary Examiner* — Thomas Black
*Assistant Examiner* — Robert Payne
(74) *Attorney, Agent, or Firm* — Morgan, Lewis & Bockius LLP

(57) ABSTRACT

A battery charging system for a vehicle includes a generator, a battery, a DC/DC converter converting the electrical power generated by the generator and supplying the converted electrical power to the electrical device of the vehicle and supplying the electrical power to an electrical device, and charging the battery, an energy storage device storing the electrical power generated from the generator and providing the stored electrical power to the DC/DC converter, and an engine control unit controlling the generator to charge the energy storage device by providing regenerative power generated by the generator in a deceleration driving section of the vehicle, calculating a low-voltage control amount determined to correspond to a state of the battery connected to the DC/DC converter and whether the electrical device of the vehicle operates, and controlling the DC/DC converter to charge the electrical power in the battery based on the calculated low-voltage control amount.

11 Claims, 6 Drawing Sheets

CONSTANT CHARGING

BATTERY CHARGING SYSTEM FOR VEHICLE AND CONTROL METHOD OF THE SAME

CROSS-REFERENCE TO RELATED APPLICATIONS

The present application claims priority of Korean Patent Application Number 10-2011-0072344 filed Jul. 21, 2011, the entire contents of which application is incorporated herein for all purposes by this reference.

BACKGROUND OF INVENTION

1. Field of Invention

The present invention relates to a battery charging system for a vehicle and a control method of the same, and more particularly, to a battery charging system for a vehicle that charges a battery by controlling a generator and a DC/DC converter, and a control method of the same.

2. Description of Related Art

The battery charging system applied to a vehicle in the related art performs constant charging control regardless of a driving state for low-voltage battery control as shown in FIG. 4A. However, in the control method, fuel is needlessly consumed due to constant charging.

In addition, the battery charging system for the vehicle in the related art controls voltage according to the driving state for low-voltage battery control as shown in FIG. 4B. However, this method burdens an electrical device due to heavy voltage fluctuation.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a battery charging system for a vehicle and a control method of the same that can improve fuel efficiency by reducing a charging amount as compared with a constant charging control method by holding a charging amount of the battery at a predetermined level and improve an electrical device depending on voltage fluctuation by reducing the number of times of voltage fluctuation as compared with voltage control depending on a driving pattern in the related art.

Some aspects of the present invention are directed to provide a battery charging system for a vehicle. Exemplary battery charging systems for a vehicle according to the present invention may include a generator generating electrical power by driving the vehicle, a battery mounted on the vehicle and charging and discharging the electrical power, a DC/DC converter connected to the battery and electrical devices of the vehicle, converting the electrical power generated by the generator and supplying the converted electrical power to the electrical devices of the vehicle, and supplying the electrical power to the battery, an energy storage device storing the electrical power generated from the generator and providing the stored electrical power to the DC/DC converter, and an engine control unit controlling the generator to charge the energy storage device by providing regenerative power generated by the generator in a deceleration driving section of the vehicle, calculating a low-voltage control amount determined to correspond to a state of the battery connected to the DC/DC converter and whether the electrical device of the vehicle operates, and controlling the DC/DC converter to charge the electrical power in the battery based on the calculated low-voltage control amount.

The engine control unit may include a plurality of controlling modules, including but not limited to an energy storage device controlling module and a number of first voltage controlling modules.

The engine control unit may include a first voltage controlling module determining the low-voltage control amount as a first low-voltage control value according to a battery temperature among states of the battery when a high-load electrical device among the electrical devices of the vehicle operates.

The engine control unit may further include a second voltage controlling module determining the low-voltage control amount as a second low-voltage control value higher than the first low-voltage control value according to the battery temperature among the states of the battery when a low-load electrical device among the electrical devices of the vehicle operates.

The engine control unit may also or further include a third voltage controlling module determining the low-voltage control amount to correspond to an State of Charge (SOC) value and a battery temperature among states of the battery when the electrical devices of the vehicle do not operate and the SOC value among the states of the battery is higher than a predetermined SOC set value.

The engine control unit may also or further include a fourth voltage controlling module determining the low-voltage control amount to correspond to a battery temperature among states of the battery when the electrical devices of the vehicle do not operate and the SOC value among the states of the battery is not higher than the predetermined SOC set value or the DC/DC converter is faulty.

Other aspects of the present invention are directed to provide a control method of a battery charging system for a vehicle, which may include a generator, a battery, an energy storage device storing electrical power generated from the generator, and a DC/DC converter connected to the battery and an electrical device of the vehicle. Exemplary control methods according to the present invention may include controlling the generator to charge the energy storage device by providing regenerative power generated by the generator in a deceleration driving section of the vehicle, calculating a low-voltage control amount determined to correspond to a state of the battery connected to the DC/DC converter and whether the electrical device of the vehicle operates, and controlling the DC/DC converter to charge the electrical power in the battery based on the calculated low-voltage control amount.

Calculating of the low-voltage control amount may include determining the low-voltage control amount as a first low-voltage control value according to a battery temperature among states of the battery when a high-load electrical device among the electrical devices of the vehicle operates, and determining the low-voltage control amount as a second low-voltage control value higher than the first low-voltage control value according to the battery temperature among the states of the battery when a low-load electrical device among the electrical devices of the vehicle operates.

Calculating of the low-voltage control amount may also or further include determining the low-voltage control amount to correspond to an SOC value and a battery temperature among states of the battery when the electrical devices of the vehicle do not operate and the SOC value among the states of the battery is higher than a predetermined SOC set value, and determining the low-voltage control amount to correspond to the battery temperature when the electrical devices of the vehicle do not operate and the SOC value is not higher than the predetermined SOC set value or the DC/DC converter is faulty.

According to various aspects of the present invention, fuel consumption depending on overcharging can be reduced as compared with the related art by performing charging control of a battery to correspond to whether a control module of an energy storage device and an electrical device operate and the state of the battery, and side effects transferred to the electrical device of a vehicle can be reduced due to small voltage fluctuation as compared with the related art.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
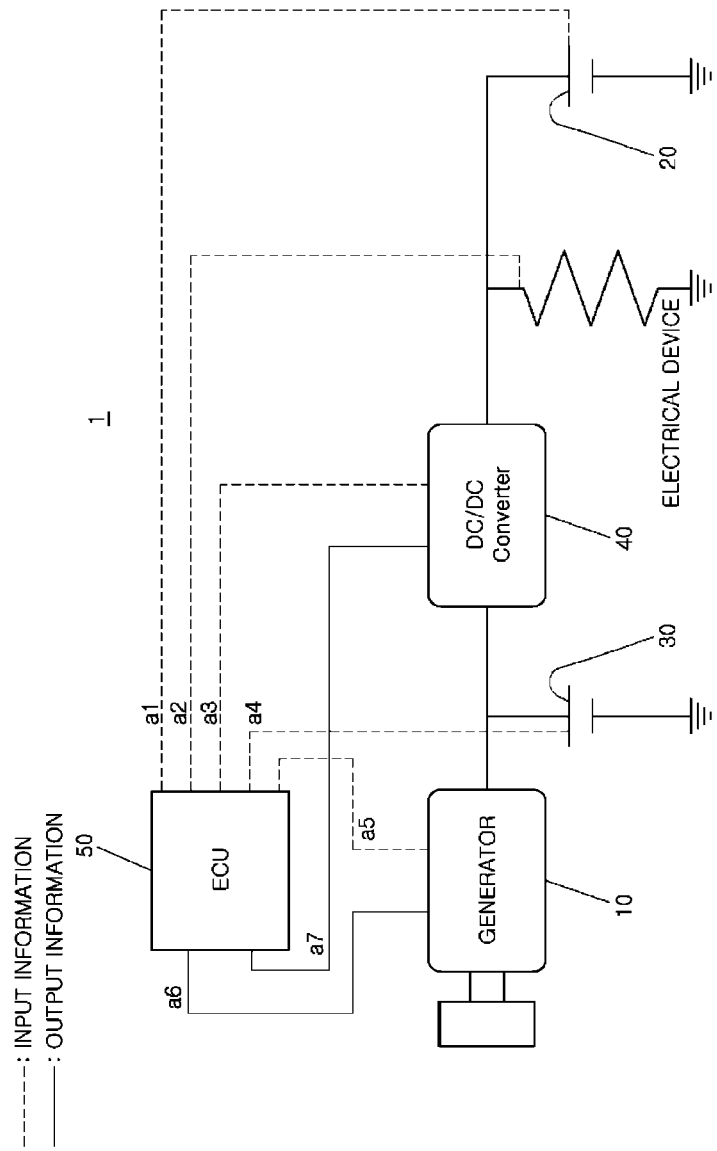
FIG. 1 is a block diagram of an exemplary battery charging system for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a battery charging system 1 for a vehicle according to various embodiments of the present invention will be described with reference to the accompanying drawings.

Referring to FIG. 1, battery charging system 1 for a vehicle according to the various embodiments of the present invention may include a generator 10, a battery 20, an energy storage device 30, a DC/DC converter 40, and an engine control unit 50. Engine control unit 50 may be expressed as an ECU which is an abbreviation of an engine control unit.

Generator 10 may be constituted by an alternator and a regulator regulating a generation amount of the alternator. Generator 10 is operated by controlling engine control unit 50 and generates electrical power by driving the vehicle.

Battery 20 is mounted on the vehicle to serve to supply power to an electrical device of the vehicle together with generator 10 and electrical power is charged by controlling engine control unit 50.

Energy storage device 30 is connected with generator 10 and DC/DC converter 40 as shown in FIG. 1 to store the electrical power generated from generator 10 and transfer the stored electrical power to DC/DC converter 40.

DC/DC converter 40 is connected to battery 20 and the electrical device of the vehicle as shown in FIG. 1 to convert the electrical power generated by generator 10 and supply the converted electrical power to the electrical device of the vehicle, and supply the electrical power to charge the battery.

Engine control unit 50 controls generator 10 to charge energy storage device 30 by providing regenerative power generated by generator 10 in a deceleration driving section of the vehicle. Further engine control unit 50 calculates a low-voltage control amount determined to correspond to a state of battery 20 connected to DC/DC converter 40 and whether the electrical device of the vehicle operates.

Signals regarding the state of battery 20 and whether the electrical device operates are inputted into engine control unit 50 as shown in dotted lines a1 and a2 as shown in FIG. 1. Engine control unit 50 controls DC/DC converter 40 to charge the electrical power in battery 20 based on the calculated low-voltage control amount. That is, as shown in a solid line a7 of FIG. 1, DC/DC converter 40 is controlled by a control signal outputted to DC/DC converter 40 from engine control unit 50.

Figure 2:
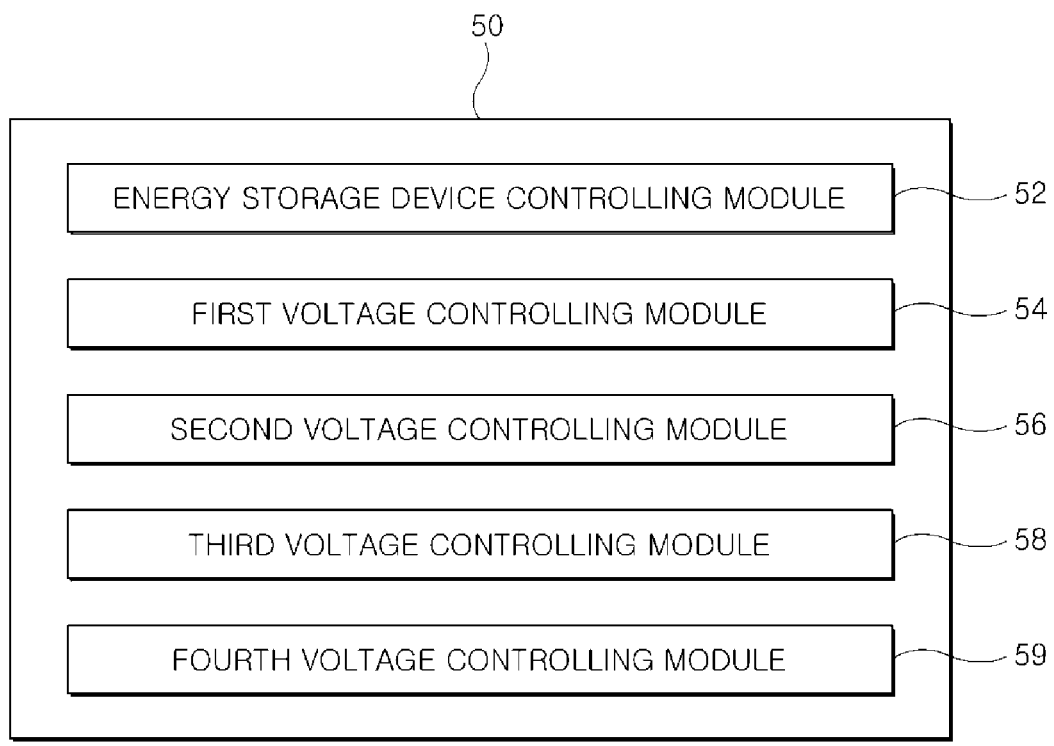
FIG. 2 is a functional block diagram of an exemplary engine control unit according to the present invention.

Hereinafter, referring to FIG. 2, engine control unit 50 according to various embodiments will be described in detail. Engine control unit 50 may include a plurality of controlling modules. Engine control unit 50 may include an energy storage device controlling module 52, a first voltage controlling module 54, a second voltage controlling module 56, a third voltage controlling module 58, and a fourth voltage controlling module 59 as shown in FIG. Herein, first voltage controlling module 54, second voltage controlling module 56, third voltage controlling module 58, and fourth voltage controlling module 59 may be operated when voltage of energy storage device 30 is stored to reach a predetermined set value of the energy storage device by an operation of the energy storage device.

Energy storage device controlling module 52 charges energy storage device 30 by providing the regenerative power generated by generator 10 in the deceleration driving section of the vehicle and providing the regenerative power to energy storage device 30.

That is, by monitoring a voltage value of energy storage device 30 through dotted line a4 shown in FIG. 1, generator 10 is controlled through a solid line a6 shown in FIG. 1 until the monitored voltage value reaches the predetermined set value of the energy storage device.

First voltage control module 54 may operate after energy storage device controlling module 52 operates. First voltage controlling module 54 determines the low-voltage control amount as a first low-voltage control value according to a battery temperature among the states of the battery when a high-load electrical device such as lamps, a wiper, or a blower among the electrical devices operates.

That is, first voltage controlling module 54 determines whether or not the electrical device through dotted lines a2 shown in FIG. 1 and determines the battery temperature through dotted lines a1, and calculates the first low-voltage control value which is the low-voltage control amount based thereon. Engine control unit 50 charges battery 20 by controlling DC/DC converter 40 through solid line a7 shown in FIG. 1 based on the calculated first low-voltage control value.

Second voltage controlling module 56 may operate after energy storage device controlling module 52 operates. Second voltage controlling module 56 determines the low-voltage control amount as a second low-voltage control value larger than the first low-voltage control value according to the battery temperature among the states of battery 20 when a low-load electrical device among the electrical devices of the vehicle operates.

That is, second voltage controlling module 56 determines whether or not the electrical device through dotted lines a2 shown in FIG. 1 and determines the battery temperature through dotted lines a1, and calculates the second low-voltage control value which is the low-voltage control amount based thereon. Engine control unit 50 charges battery 20 by controlling DC/DC converter 40 through solid line a7 shown in FIG. 1 based on the calculated second low-voltage control value.

Third voltage controlling module 58 may operate after energy storage device controlling module 52 operates. Third voltage controlling module 58 determines the low-voltage control amount to correspond to an State of Charge (SOC) value and the battery temperature when the electrical device of the vehicle does not operate and the SOC value among the states of battery 20 is higher than a predetermined SOC set value.

That is, third voltage controlling module 58 determines the SOC value of the battery and the battery temperature through dotted lines a1 shown in FIG. 1 and calculates the low-voltage control amount based thereon. Engine control unit 50 charges battery 20 by controlling DC/DC converter 40 through solid line a7 shown in FIG. 1 based on the calculated low-voltage control amount.

Fourth voltage controlling module 59 may operate after energy storage device controlling module 52 operates. Fourth voltage controlling module 59 determines the low-voltage control amount to correspond to the battery temperature among the states of battery 20 when the electrical device of the vehicle does not operate and the SOC value among the states of battery 20 is not higher than the predetermined SOC set value in third voltage controlling module or DC/DC converter 40 is faulty.

That is, fourth voltage controlling module 59 determines the battery temperature through dotted lines a1 shown in FIG. 1 and calculates the low-voltage control amount based thereon. Engine control unit 50 charges battery 20 by controlling DC/DC converter 40 through solid line a7 shown in FIG. 1 based on the calculated low-voltage control amount.

According to various embodiments of the present invention, battery charging system 1 for the vehicle can reduce fuel consumption depending on overcharging as compared with the related art by performing charging control of the battery to correspond to whether energy storage device controlling module 52 and the electrical device operate and the state of the battery, and reduce side effects transferred to the electrical device of the vehicle due to small voltage fluctuation as compared with the related art.

Figure 3A:
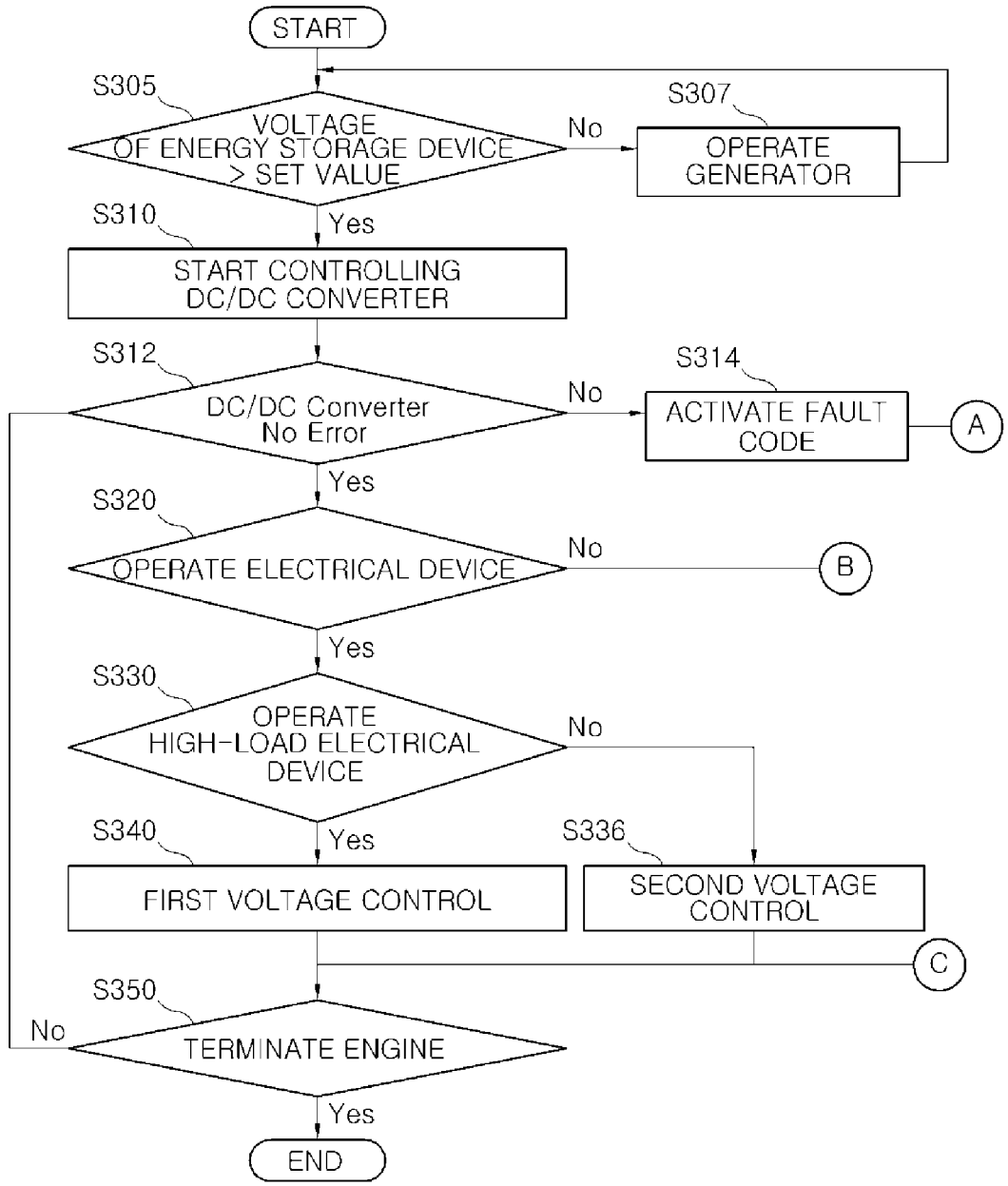
FIG. 3 is a diagram showing a control procedure of an exemplary battery charging system for a vehicle according to the present invention.
Figure 3B:
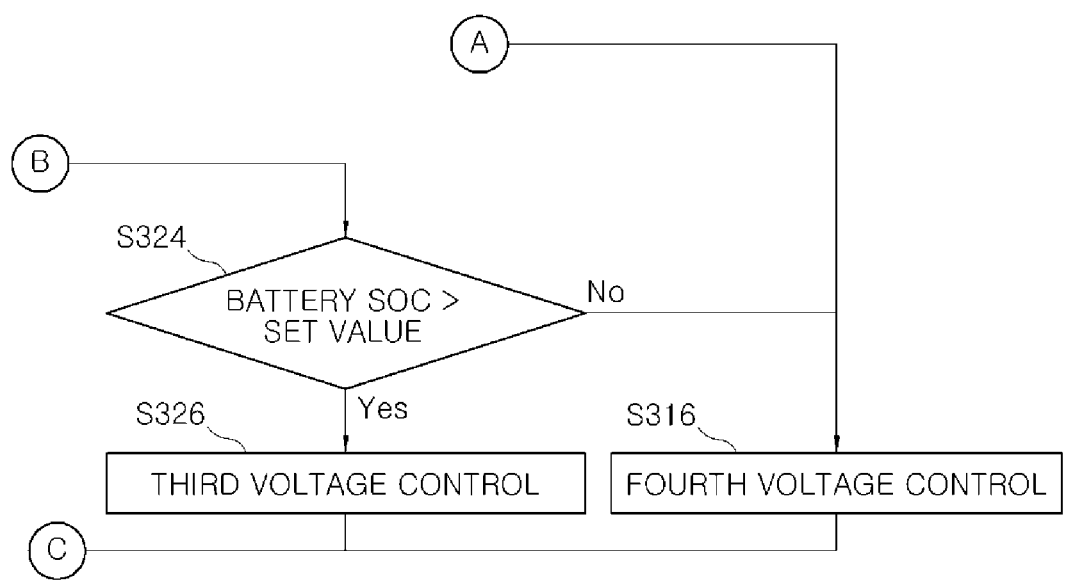
Figure 4A:
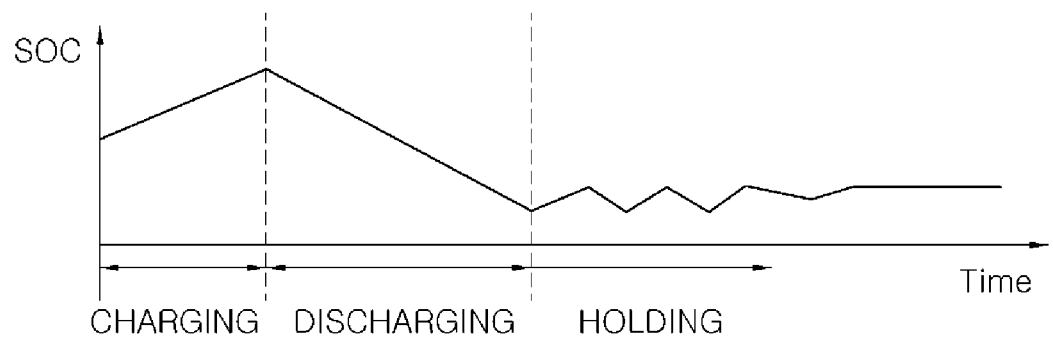
FIG. 4 is a graph for describing a battery charging system for a vehicle in the related art.
Figure 4B:
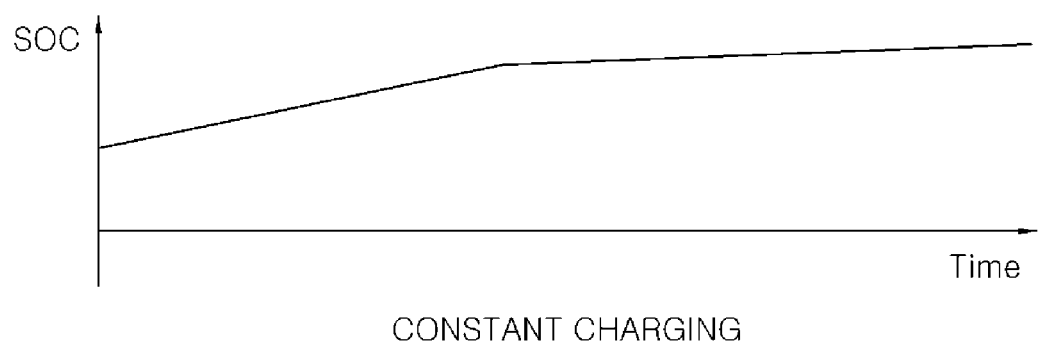

Hereinafter, referring to FIG. 3, a control method of battery charging system 1 for the vehicle according to various embodiments of the present invention will be described in detail.

When an engine is operated by starting the vehicle, engine control unit 50 judges whether voltage of an energy storage device 30 is larger than a predetermined set value (S305) and controls a generator 10 to operate when engine control unit 50 judges that the voltage of energy storage device 30 is not larger than the set value (S307). In addition, the process returns to step S305.

That is, through step S305 and S307, engine control unit 50 charges energy storage device 30 by operating generator 10 until the voltage of energy storage device 30 reaches the predetermined set value.

When the voltage of energy storage device 30 reaches the predetermined set value by steps S305 and S307, engine control unit 50 starts to control a DC/DC converter 40 to operate (S310). Engine control unit 50 judges whether DC/DC converter 40 is faulty (S312) and when DC/DC converter 40 is faulty, engine control unit 50 activates a fault code corresponding to the fault (S314). In addition, engine control unit 50 performs a fourth voltage controlling module 59 (S316) and when the engine is terminated (S350), this control procedure is terminated.

As a judgment result in step S312, when it is judged that DC/DC converter 40 is not faulty, engine control unit 50 judges whether an electrical device of the vehicle operates (S320) and when the electrical device operates, control unit 50 judges whether an SOC value of a battery 20 is larger than a predetermined SOC set value (S324). As a judgment result in step S324, when the SOC value of battery 20 is larger than the SOC set value, engine control unit 50 performs a third voltage controlling module 58 and when the SOC value of battery 20 is not larger than the SOC set value, engine control unit 50 performs a fourth voltage controlling module 59 which is step.

As a judgment result of step S320, when the electrical device of the vehicle operates, engine control unit 50 judges whether a high-load electrical device such as lamps, a wiper, or a blower among the electrical devices operates (S330) and when the high-load electrical device does not operate, engine control unit performs second voltage controlling module 56 (S336) and when the engine is terminated (S350), this control procedure is terminated.

As a judgment result in step S330, engine control unit 50 performs a first voltage controlling module 54 when the high-load electrical device operates (S340) and engine control unit 50 judges whether the engine is terminated (S350), and when the engine is not terminated, the process proceeds to step S312. On the contrary, as a judgment result in step S350, when the engine is terminated, the control procedure is terminated.

As described above, since battery charging system 1 for the vehicle according to various embodiments targets a configuration commonly applied to all general vehicles, vehicle battery system 1 can be widely applied to all vehicles regardless of a hybrid vehicle and an electric vehicle in addition to a general vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery charging system for a vehicle, comprising:
a generator generating electrical power by driving the vehicle;
a battery mounted on the vehicle and charging and discharging the electrical power;
a Direct Current/Direct Current (DC/DC) converter connected to the battery and electrical devices of the vehicle, converting the electrical power generated by the generator and supplying the converted electrical power to the electrical devices of the vehicle, and supplying the electrical power to the battery;
an energy storage device storing the electrical power generated from the generator and providing the stored electrical power to the DC/DC converter; and
an engine control unit controlling the generator to charge the energy storage device by providing regenerative power generated by the generator in a deceleration driving mode of the vehicle, calculating a low-voltage control amount determined to correspond to a state of the battery connected to the DC/DC converter and whether the electrical device of the vehicle operates, and controlling the DC/DC converter to charge the electrical power in the battery based on the calculated low-voltage control amount;
wherein the engine control unit includes a first voltage controlling module determining the low-voltage control amount as a first low-voltage control value according to a battery temperature among states of the battery when a high-load electrical device among the electrical devices of the vehicle operates.

2. The battery charging system for a vehicle as defined in claim 1, wherein the engine control unit further includes a second voltage controlling module determining the low-voltage control amount as a second low-voltage control value higher than the first low-voltage control value according to the battery temperature among the states of the battery when a low-load electrical device among the electrical devices of the vehicle operates.

3. The battery charging system for a vehicle as defined in claim 1, wherein an alternator of the generator is not included in the electrical device of the vehicle.

4. The battery charging system for a vehicle as defined in claim 1, wherein the engine control unit includes a third voltage controlling module determining the low-voltage control amount to correspond to an State of Charge (SOC) value and a battery temperature among states of the battery when the electrical devices of the vehicle do not operate and the SOC value among the states of the battery is higher than a predetermined SOC set value.

5. The battery charging system for a vehicle as defined in claim 4, wherein the engine control unit includes a fourth voltage controlling module determining the low-voltage control amount to correspond to a battery temperature among states of the battery when the electrical devices of the vehicle do not operate and the SOC value among the states of the battery is not higher than the predetermined SOC set value or the DC/DC converter is faulty.

6. The battery charging system for a vehicle as defined in claim 1, wherein the vehicle is a general vehicle, a hybrid vehicle, or an electrical vehicle.

7. A control method of a battery charging system for a vehicle, which includes a generator, a battery, an energy storage device storing electrical power generated from the generator, and a DC/DC converter connected to the battery and electrical devices of the vehicle, the method comprising:

controlling the generator to charge the energy storage device by providing regenerative power generated by the generator in a deceleration driving mode of the vehicle;
calculating a low-voltage control amount determined to correspond to a state of the battery connected to the DC/DC converter and whether the electrical devices of the vehicle operate; and
controlling the DC/DC converter to charge the electrical power in the battery based on the calculated low-voltage control amount;
wherein the calculating of the low-voltage control amount includes:
determining the low-voltage control amount as a first low-voltage control value according to a battery temperature among states of the battery when a high-load electrical device among the electrical devices of the vehicle operates; and
determining the low-voltage control amount as a second low-voltage control value higher than the first low-voltage control value according to the battery temperature among the states of the battery when a low-load electrical device among the electrical devices of the vehicle operates.

8. The control method as defined in claim 7 wherein the calculating of the low-voltage control amount includes:
determining the low-voltage control amount to correspond to an SOC value and a battery temperature among states of the battery when the electrical devices of the vehicle do not operate and the SOC value among the states of the battery is higher than a predetermined SOC set value; and
determining the low-voltage control amount to correspond to the battery temperature when the electrical devices of the vehicle do not operate and the SOC value is not higher than the predetermined SOC set value or the DC/DC converter is faulty.

9. The battery charging system for a vehicle as defined in claim 2, wherein the engine control unit further includes a third voltage controlling module determining the low-voltage control amount to correspond to an SOC value and the battery temperature among the states of the battery when the electrical devices of the vehicle do not operate and the SOC value among the states of the battery is higher than a predetermined SOC set value.

10. The battery charging system for a vehicle as defined in claim 9, wherein the engine control unit further include a fourth voltage controlling module determining the low-voltage control amount to correspond to the battery temperature among the states of the battery when the electrical devices of the vehicle do not operate and the SOC value among the states of the battery is not higher than the predetermined SOC set value or the DC/DC converter is faulty.

11. The control method as defined in claim 7, wherein the calculating of the low-voltage control amount further includes:
determining the low-voltage control amount to correspond to an SOC value and the battery temperature among the states of the battery when the electrical devices of the vehicle do not operate and the SOC value among the states of the battery is higher than a predetermined SOC set value; and
determining the low-voltage control amount to correspond to the battery temperature when the electrical devices of the vehicle do not operate and the SOC value is not higher than the predetermined SOC set value or the DC/DC converter is faulty.

* * * * *